Nov. 22, 1927.

F. M. WICHMAN ET AL

MIXING AND DISINTEGRATING APPARATUS

Filed April 7, 1925

1,649,939

Patented Nov. 22, 1927.

1,649,939

UNITED STATES PATENT OFFICE.

FRANK M. WICHMAN AND ALFRED P. HARTLAPP, OF SALT LAKE CITY, UTAH, ASSIGNORS TO UNITED STATES SMELTING, REFINING & MINING COMPANY, OF PORTLAND, MAINE, A CORPORATION OF MAINE.

MIXING AND DISINTEGRATING APPARATUS.

Application filed April 7, 1925. Serial No. 21,286.

The present invention relates to mixing and disintegrating apparatus and more particularly to apparatus for breaking up clayey materials, such as flotation concentrates and the like, and mixing them with coarse concentrates, crushed ore, or similar materials.

The object of the present invention is to provide a mixing and disintegrating apparatus for materials of this general nature by which thorough and efficient disintegration and mixing may be obtained without clogging of the apparatus.

With this object in view, the principal feature of the invention contemplates the provision of a table, or hearth, in combination with a series of plows and cutting disks to which the material is alternately presented upon relative rotation between the table and the plows and disks. The disks are similar in form to the well-known types of harrow disks and serve to cut or break up the material which is presented to them, and the plows, which are similar to the usual forms of plowshares, serve to stir and turn over the material and also to deflect the material toward the periphery of the table, where it may be conveniently collected. In the preferred form of the invention, the material is fed to the center of the table and is alternately presented to successive disks and plows for breaking up and mixing respectively, the successive plows being arranged at increasing radial distances from the center of the table.

Other features of the invention consist in certain novel features of construction and combination and arrangement of parts hereinafter described and particularly defined in the claims.

Figure 1:
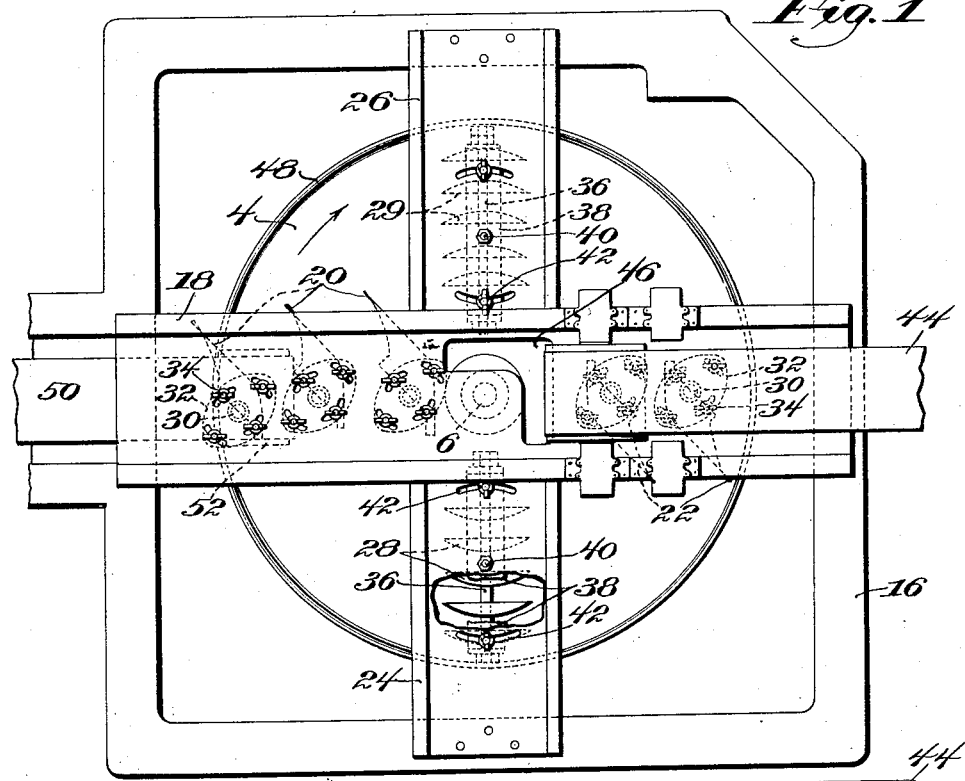
Figure 2:
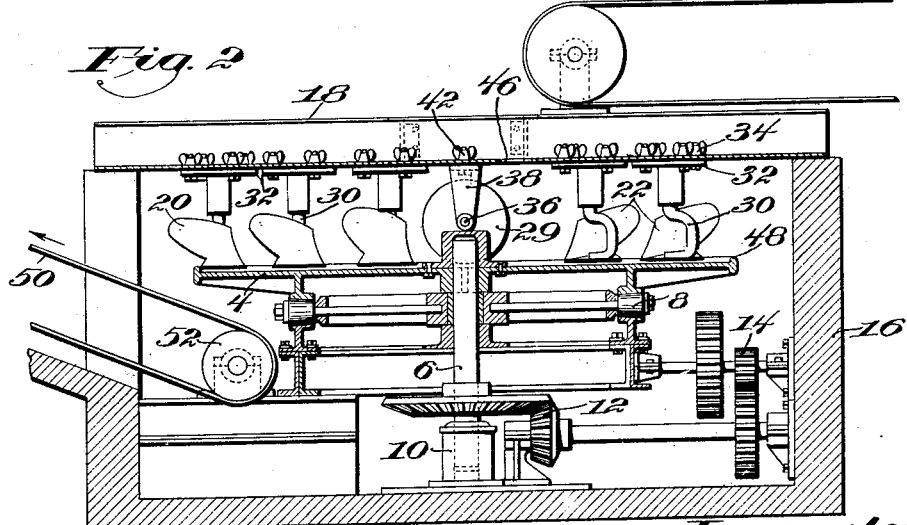

In the accompanying drawings, Fig. 1 is a plan view of a mixing and disintegrating apparatus embodying the invention, and Fig. 2 is a sectional elevation of the apparatus shown in Fig. 1.

Referring to the drawings, the apparatus shown comprises a table, or hearth, 4 mounted on a vertical shaft 6 and supported upon suitable roller bearings, the shaft being journaled in an end-thrust bearing 10 and driven through bevel gears and suitable spur gears 14 from any desired source of power. The table is inclosed within a concrete foundation 16. Mounted on the foundation is a plow support 18 extending diametrically above the table. Two sets of plows 20 and 22 arranged radially of the table depend from the support so that their points are slightly above and out of engagement with the table surface. As shown in Fig. 1, the set of plows indicated at 20 comprises three plows, and the set indicated at 22 comprises two plows. Upon rotation of the table in the direction of the arrow the material, which is fed thereto in a manner presently to be described, engages successively with the individual plows of the two sets from the center to the periphery of the table, and for this purpose the radial spacing of the plows of the set 22 from the center of the table is intermediate to the spacing of the plows 20, as clearly appears from Fig. 1. A pair of cutting disk supports 24 and 26 are supported on the foundation and connected at their inner ends to the support 18, being arranged substantially at right angles to the latter support. The supports 24 and 26 each carry a gang of cutting disks 28, 29 similar in form to the ordinary forms of harrow disks and mounted so that their lower cutting edges are raised slightly above the surface of the table.

The individual plows are mounted on supporting bars 30 which are attached to adjusting plates 32, the plates being attached by bolt-and-slot connections 34 with the support 18 in order to permit angular adjustment of the plows with respect to the table. In order to provide for angular adjustment of the cutting disks, each gang of disks is mounted on a shaft 36 journaled in a yoke-shaped bracket 38 which is pivoted at 40 on its corresponding support, the bracket having bolt-and-slot connections 42 with the support, by which the disks may be adjustably secured in any desired position.

The material to be mixed is fed on a belt conveyor 44 through an opening 46 in the support 18 to the center of the table. After continued operation the table is provided with a practically permanent bed of material due to the fact that the plows and disks do not engage directly with the table. The table has a rim 48 upstanding therefrom to a level approximating the lowermost position of the plows and disks in order to retain the bed of material on the table. By this means contact of the plows and disks directly with the table is avoided, thus eliminating wear on the parts. Upon rotation of the table the material is first presented to the innermost cutting disk of the set 28 by which lumps of the material are cut and broken up. Upon further rotation of the table the material is presented to the innermost plow of the set 20 by which it is stirred and turned over and also deflected slightly toward the periphery of the table. The material is then engaged by the cutting disks of the next set and then by the first of the plows 22, being again deflected further toward the periphery of the table to be engaged by one of the intermediate disks of the set 28. It will be seen that in its progress about the table the material is acted upon at least five times by the plows, in each case being turned and stirred thereby, and an equal number of times by the cutting disks which serve to cut and disintegrate the material. The material is successively presented to the plows at increasing distances from the center of the table so that the movement toward the periphery is effectively accomplished. The amount of deflection may be varied by adjusting the angular positions of the plows, and the degree to which the material is disintegrated may be varied by adjusting the angular positions of one or both of the sets of cutting disks. In some cases it is desirable to adjust the two sets of disks at different angles in order that one set may tend to break up the material into coarse lumps and the other set into finer lumps. Under certain conditions of operation a double disintegrating action is obtained by adjusting one set of disks in a direction opposite to the other set relatively to the direction of movement of the material, thus insuring thorough disintegration and complete mixing of the material.

The material is conveyed away from the periphery of the table after it is moved outwardly by means of a belt conveyor 50 passing over a pulley 52 and moving in the direction of the arrow, as shown in Fig. 2.

What is claimed is:

1. A mixing and disintegrating apparatus comprising a table, means for feeding material to the table, a support above the table, a series of plows and a series of cutting disks secured to the support and mounted slightly above and out of engagement with the table, the plows and disks being arranged to be alternately engaged by the material to stir and cut the material and simultaneously to deflect it toward the periphery of the table upon relative rotation of the table and the support, and means for relatively rotating the table and the support.

2. A mixing and disintegrating apparatus comprising a table, means for rotating the table, means for feeding the material to be mixed to the center of the table, a series of cutting disks to which the material is presented upon rotation of the table, and a series of plows placed at increasing distances from the center of the table to engage particles of the material at increasing radial distances in their path of movement to stir the material and deflect it toward the periphery of the table.

3. A mixing and disintegrating apparatus comprising a table, and a plurality of sets of cutting disks and plows to which the material to be mixed is alternately presented upon rotation of the table. the plows of the various sets being spaced at increasing distances from the center of the table to engage particles of the material at increasing radial distances in their path of movement to deflect the material toward the periphery of the table.

4. A mixing and disintegrating apparatus comprising a table, means for rotating the table, means for feeding the material to be mixed to the center of the table, a support, a plurality of sets of cutting disks and plows arranged alternately around the table and slightly out of engagement therewith, the material being adapted to be alternately engaged by the disks, and successive plows for cutting the material and stirring it, the successive plows being arranged at increasing distances from the center of the table and adapted to engage particles of the material at increasing radial distances in their path of movement to deflect the material toward the periphery of the table.

5. A mixing and disintegrating apparatus comprising a table, means for feeding the material to be mixed to the table, a plurality of sets of plows and sets of cutting disks arranged above the table, means for relatively rotating the table and the sets of plows and disks, the plows and disks arranged to be alternately engaged by the material upon such relative rotation and the radial distances of the plows of each set from the center of the table being intermediate to the distances of the plows of the next succeeding set, whereby the material is presented successively to the plows and disks for continuous deflection toward the periphery of the table and for simultaneous stirring and cutting thereof.

6. A mixing and disintegrating apparatus comprising a table, means for feeding the material to be mixed to the center of the table, a plurality of sets of cutting disks arranged above the table, a plurality of sets of plows alternating with the cutting disks, means for relatively rotating the table and the sets of plows and disks, the plows being angularly arranged to deflect the material continuously from the inner part of the table toward the periphery.

7. A mixing and disintegrating apparatus comprising a table, means for feeding the material to be mixed to the center of the table, a plurality of sets of cutting disks arranged above the table, a plurality of sets of plows alternating with the cutting disks, means for relatively rotating the table and the sets of plows and disks, the plows being angularly arranged to deflect the material continuously from the inner part of the table toward the periphery, a conveyer beneath the table, one of the plows being arranged directly above the conveyer at the periphery to discharge the material onto the conveyer.

FRANK M. WICHMAN.
ALFRED P. HARTLAPP.